Oct. 20, 1942.  P. A. VAN DER MEULEN  2,299,440
SYSTEM FOR PRODUCING BUTTER
Filed Aug. 8, 1939

INVENTORS
Peter A. van der Meulen
and David Levowitz
BY George T. Gill
ATTORNEY

Patented Oct. 20, 1942

2,299,440

UNITED STATES PATENT OFFICE 2,299,440

SYSTEM FOR PRODUCING BUTTER

Peter A. van der Meulen and David Levowitz, New Brunswick, N. J., assignors to Research Corporation, a corporation of New York Application August 8, 1939, Serial No. 289,018

6 Claims. (Cl. 31—34)

In Patent No. 2,168,376, issued August 8, 1939, to Peter A. van der Meulen and David Levowitz, there is disclosed a process for producing butter that is capable of continuous operation. This continuity of operation is made possible by virtue of the fact that butter is produced, according to the process, without using a churn. Briefly, the process consists of mixing cream and water in proportionate amounts, heating the mixture and delivering the mixture to a centrifuge that is adjusted to deliver a product containing at least eighty percent butter fat.

The primary object of the invention herein disclosed is to provide a system and apparatus for performing this process of producing butter. Another object of the invention is to provide a system of this nature that is simple of construction, readily installed, inexpensive to maintain efficient in operation and that is capable of carrying out the aforesaid process of producing butter as a continuous operation. A further object of the invention is to provide improved apparatus for such a system.

Figure 1:
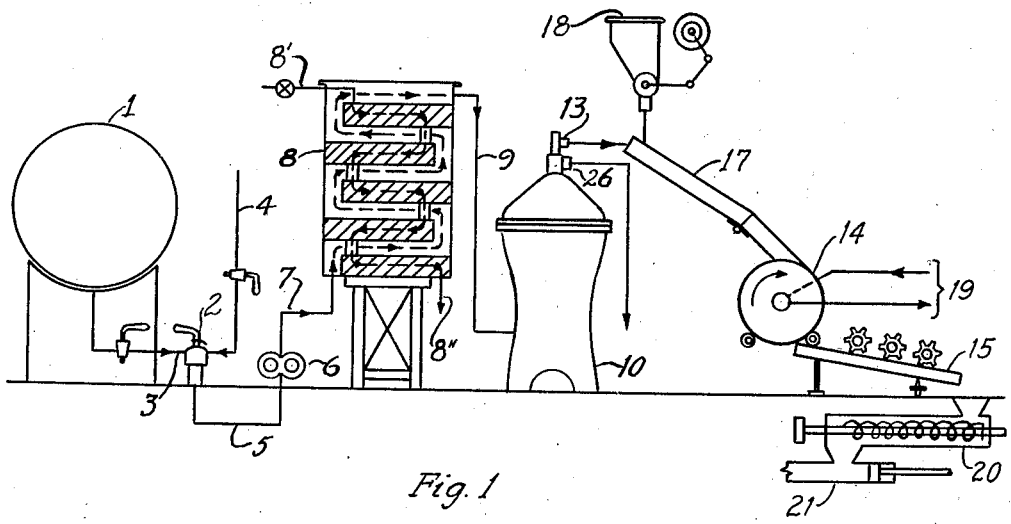
Figure 2:
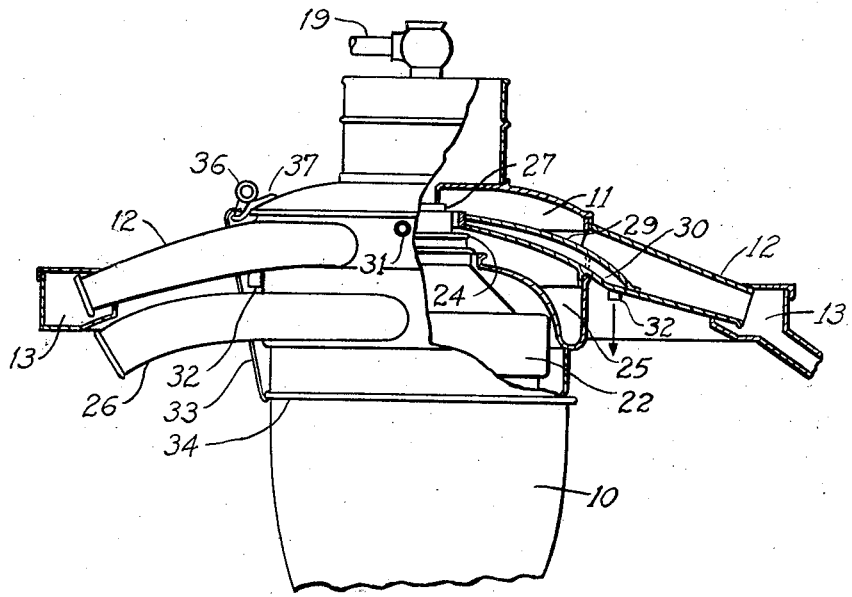

These objects and certain advantages which will hereinafter appear are realized in the system and apparatus illustrated in the accompanying drawing in which:

Fig. 1 is a diagrammatic illustration of one system embodying the invention; and Fig. 2 is a fragmentary elevation, partly in section of a separator that may be used in the system.

In general, the system illustrated in the drawing comprises a cream storage container in which a supply of cream of proper butter fat content is maintained. This cream storage container is connected to a mixer which is also connected to a source of water. The mixer is such as to mix cream and water in proportionate amounts. The outlet from the mixer is connected to a heat transfer device preferably of the type that is capable of heating a liquid as it flows therethrough. In the heat-transfer device the water-cream mixture is heated to the proper temperature and delivered to a centrifugal separator to which the heat transfer device is connected.

The cream storage container of the specific system illustrated in the drawing is indicated as a large storage tank 1. The size of this tank will of course vary with the size of the remainder of the system which is designed in accordance with the desired rate of butter production. The tank 1 is connected to a mixing valve 2 by a pipe 3.

A supply of water is available. This may be the municipal water supply or a private supply of the particular dairy utilizing the system. A pipe 4 connects the mixing valve 2 to the water supply. This mixing valve may be any one of the many such valves that are available on the market. Its function is to bring together the water and cream as they flow continuously in proportionate amounts. Preferably, the valve is adjustable so that the water and cream may be mixed in varying proportions between one part of cream to one part of water and one part of cream to ten parts of water.

The outlet from the mixing valve through which the water-cream mixture flows from the valve is connected by a pipe 5 to the intake side of a pump 6. This pump is of the positive-displacement type so that the water-cream mixture is delivered at a constant rate of flow. Preferably, although not necessarily, the pump may be of variable capacity. The function of the pump is to effect, at a constant rate, a continuous flow of liquid through the system. This pump may be driven by an independent source of power such as an electric motor (not shown) directly connected thereto.

The outlet, or pressure side of the pump is connected by a pipe 7 to the inlet side of a heat-transfer device 8. This heat-transfer device may be one of the usual and well known types in which, the liquid to be heated, in this instance the water-cream mixture, passes through one or more heat-transfer coils in a continuous stream. These coils are within the container that is maintained filled with a heating medium such for example as steam. However, the type of heater shown in the drawing of which the well-known "Full-Flo" is an example, is better suited to the dairy industry because the plate heat exchange surfaces thereof are more easily cleaned. The capacity of the heater should be such as to heat the water-cream mixture passing therethrough to a temperature between 115° and 180° F. Proper temperature regulators (not shown but well known in the heat-transfer art) are used to regulate the temperature of the water-cream mixture. If it be desired to maintain the water-cream mixture at this elevated temperature for a period of time, the heat-transfer device will be designed accordingly, i. e. to regulate the time of passage of the water-cream mixture therethrough. In the heat transfer device shown the heating fluid or steam enters through a supply pipe 8', passes through as indicated and is discharged through a pipe 8".

From the heat-transfer device, the water-cream mixture passes at the elevated temperature through a pipe 9 to the inlet of a centrifugal separator 10, which may be of the type well-known in the dairy industry as "Air-tight" with the cream outlet adjusted to yield eighty percent or more butter fat. However, an ordinary standard cream separator may be used if modified as follows: The inlet to the separator bowl is constricted to reduce the flow to approximately one-half of the normal flow to the separator and the cream screw is adjusted to yield 80% or more butter fat. The separator is modified, as illustrated in Fig. 2, by affixing two large spouts 12, 12, larger than normally used, on opposite sides of cream receptacle 11 and in communication with the chamber of the receptacle. The cream receptacle 11 and inlets to spouts 12, 12 are heated, preferably maintained at a temperature of substantially 130° F. The heating is accomplished either by surrounding the cream receptacle 11 with electrical heating elements (not shown) or by a water jacket. In the latter instance the water jacket comprises a separate annular chamber 30 made by attaching in inverted position a trough like member 29 to the bottom of receptacle 11. The member 29 preferably extends at least part way into spouts 12 to permit heating of these portions of the passages through which the butter moves in leaving the centrifuge. An inlet 31 and preferably a plurality of such inlets permit entrance of heating fluid into the chamber 30; the fluid leaves through outlets 32, 32. Hot water may thus be circulated through this chamber and maintain the cream receptacle 11 and spouts 12, 12 at the desired temperature to maintain the butter in condition to flow freely. The spouts 12, 12 discharge into a common collector conduit 13 which is preferably heated.

Many of the features of the separator shown in Fig. 2 will be recognized by those familiar with the art as standard with several well known makes of cream separators. The mixture to be separated is fed through a feed pipe 19 into the receptacle on top of the apparatus from which it flows by gravity into the interior of the revolving bowl 22. After separation in bowl 22 the two components of the mixture, in this case butter substance and wash water, flow separately from the bowl, the former through a conventional outlet including a "cream screw" generally designated by numeral 27 into receptacle 11, and the latter over weir 24 into receptacle 25 and through spout 26 to drainage. The assembly of receptacles, covers and spouts which nest together are fastened to the frame of the separator with a plurality of strap clamps 33. The bottom of clamp 33 is bent in hook fashion to attach under bead 34 at the top of the frame of the separator. To the top of the clamp a member 36 is movably attached, one end of member 36 being adapted for a finger grip the other end being shaped to fit into fixture 37 which is riveted to the top of the top cover. By manipulating member 36, tension in strap 33 can be lessened and the strap removed. In the position shown, the covers are held tightly in position on top of the separator frame.

The collector conduit 13 delivers the molten butter through a conveyor 17 to a cooling drum 14, from which it is delivered to a conveyor and worker 15. The flow of cooling liquid to and from the drum is indicated by the lines 19. The amount the butter is cooled on the cooling drum will depend to some extent upon the amount of working to be done on the butter. Before the butter reaches the cooling drum, salt may be added if the butter is to be salted. From the worker 15 the butter passes to a screw conveyor 20 by which it is delivered to a forming and packaging machine.

From the foregoing description of the embodiment of the invention illustrated in the drawing, it will be seen that by this invention there is provided a system for producing butter that is capable of continuous operation. It will be obvious that various changes may be made by those skilled in the art in the details of the embodiment of the invention illustrated in the drawing and described in detail above within the principle and scope of the invention as expressed in the appended claims.

We claim:

1. A system for producing butter comprising in combination a cream storage container, a supply of water, means for mixing cream and water in proportionate amounts connected to the cream storage container and the water supply, means for heating the water-cream mixture, and a centrifugal separator connected to receive the water-cream mixture and adjusted to deliver a product possessing the properties of butter and containing at least eighty percent fat, whereby butter is obtained directly from the separator.

2. A system for the continuous production of butter comprising in combination a cream storage container, a supply of water, means for mixing cream and water in proportionate amounts connected to the cream storage container and the supply of water, means for heating the water-cream mixture, a centrifugal separator connected to said heating means and adjusted to deliver a product possessing the properties of butter and containing at least eighty percent fat, whereby butter is obtained directly from the separator, and means for causing a continuous flow through the system.

3. A system for the continuous production of butter comprising in combination a cream storage container, a supply of water, a mixing valve for mixing the cream and water in proportionate amounts connected to the cream storage container and the water supply, means for heating the water-cream mixture, a centrifugal separator, and means for effecting a continuous flow through the system, the centrifugal separator being adjusted to deliver a product possessing the properties of butter and containing at least eighty percent fat, whereby butter is obtained directly from the separator.

4. A system for the continuous production of butter comprising in combination a cream storage container, a supply of water, a mixing device for mixing the cream and water in proportionate amounts connected to the cream storage container and the water supply, a heat-transfer device for heating the water-cream mixture in continuous flow, a centrifugal separator connected to the heat-transfer device and adjusted to deliver a product possessing the properties of butter and containing at least eighty percent fat, whereby butter is obtained directly from the separator, and means for effecting a continuous flow through the system.

5. A system for the continuous production of butter comprising in combination a cream storage container, a supply of water, a mixing valve for mixing proportionate amounts of cream and water connected to the cream storage container and the water supply, a heat-transfer device for heating the cream-water mixture in continuous flow connected to the mixing valve, a centrifugal separator connected to the heat-transfer device and adjusted to deliver a product possessing the properties of butter and containing at least eighty percent fat, whereby butter is obtained directly from the separator, and a pump for effecting a continuous flow through the system.

6. A system for producing butter comprising in combination a cream storage container, a supply of water, fluid heating means, means for mixing the cream and water in proportionate amounts connected to said water supply and said cream storage container, the said fluid heating means being arranged to supply heat so that the temperature of the water-cream mixture is above the normal temperature of the supply, and a centrifugal separator being adjusted to deliver a product possessing the properties of butter and containing at least eighty percent fat, whereby butter is obtained directly from the separator.

PETER A. VAN DER MEULEN.
DAVID LEVOWITZ.